(12) United States Patent
Boltyenkov et al.

(10) Patent No.: US 8,199,952 B2
(45) Date of Patent: Jun. 12, 2012

(54) METHOD FOR ADAPTIVE CONSTRUCTION OF A SMALL CIC HEARING INSTRUMENT

(75) Inventors: Artem Boltyenkov, Lawrenceville, NJ (US); Anthony Strano, Highland Park, NJ (US); Daniel Meighan, Toms River, NJ (US); Salman Parsi, Somerset, NJ (US)

(73) Assignee: Siemens Hearing Instruments, Inc., Piscataway, NJ (US)

( * ) Notice: Subject to any disclaimer, the term of this patent is extended or adjusted under 35 U.S.C. 154(b) by 956 days.

(21) Appl. No.: 12/183,306

(22) Filed: Jul. 31, 2008

(65) Prior Publication Data

US 2009/0245559 A1 Oct. 1, 2009

Related U.S. Application Data

(60) Provisional application No. 60/041,336, filed on Apr. 1, 2008.

(51) Int. Cl.
*H04R 25/00* (2006.01)
(52) U.S. Cl. ........ 381/328; 381/322; 381/323; 381/324; 381/325; 381/329
(58) Field of Classification Search .................. 381/322, 381/323, 324, 325, 328, 329
See application file for complete search history.

(56) References Cited

U.S. PATENT DOCUMENTS

| | | |
|---|---|---|
| 6,259,962 B1 | 7/2001 | Gothait |
| 6,724,902 B1 | 4/2004 | Shennib et al. |
| 6,850,334 B1 | 2/2005 | Gothait |
| 7,209,797 B2 | 4/2007 | Kritchman et al. |
| 7,300,619 B2 | 11/2007 | Napadensky et al. |
| 2002/0196954 A1 | 12/2002 | Marxen |

OTHER PUBLICATIONS

Objet Connex 500™ Apr. 21, 2008—pp. 1-5.
Extended European Search Report dated Dec. 21, 2009 in European Patent Application No. 09154951.9.

*Primary Examiner* — Andy Huynh
(74) *Attorney, Agent, or Firm* — Francis G Montgomery

(57) ABSTRACT

A small hearing aid is provided which fits completely in an ear canal of a user wherein a shell as an outer housing of the hearing aid is shaped to closely surround components of the hearing aid to provide a gap between the hearing canal inner walls and the shell to allow flow of air when the hearing aid is mounted in the ear by a mounting element connected to the shell. The mounting element is provided with at least one aperture to allow the air flow. In a fabricating method, an image of the shell is shrunk to closely surround the hearing aid components while maintaining a shape of the ear canal to assure a custom fit.

4 Claims, 7 Drawing Sheets

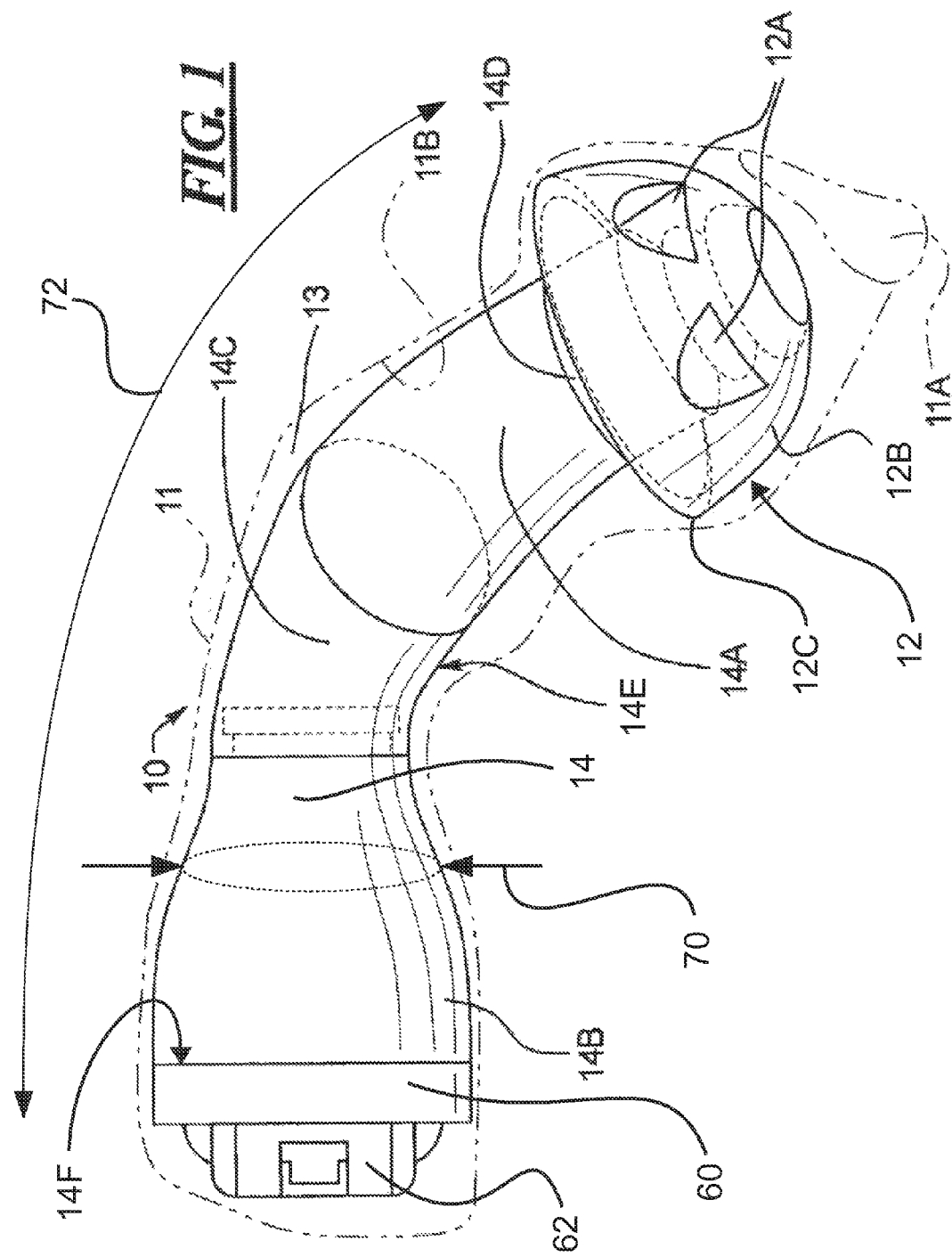

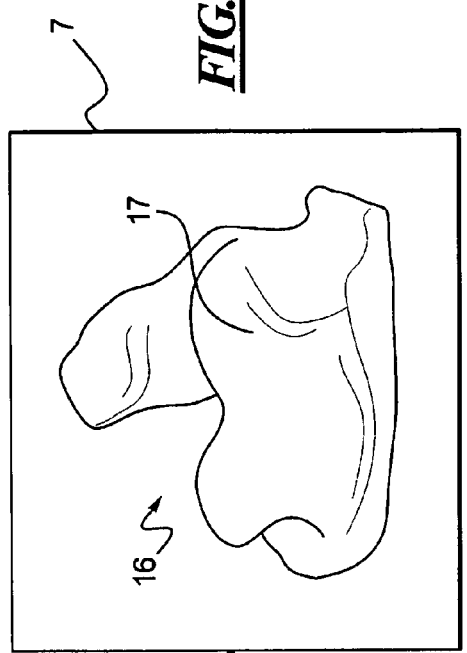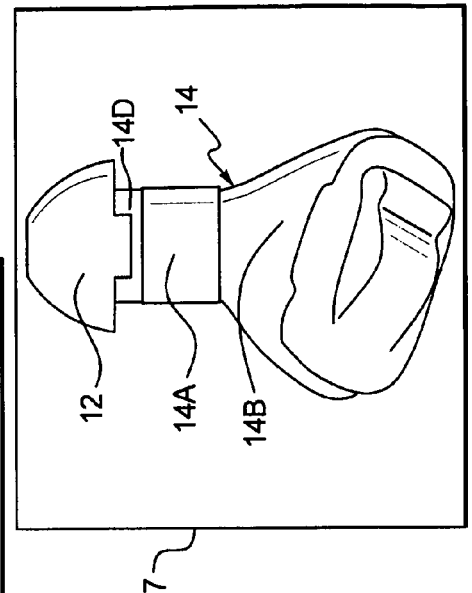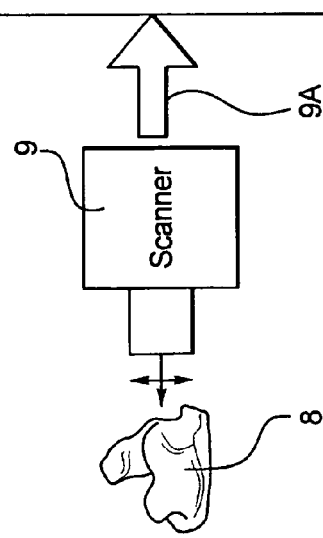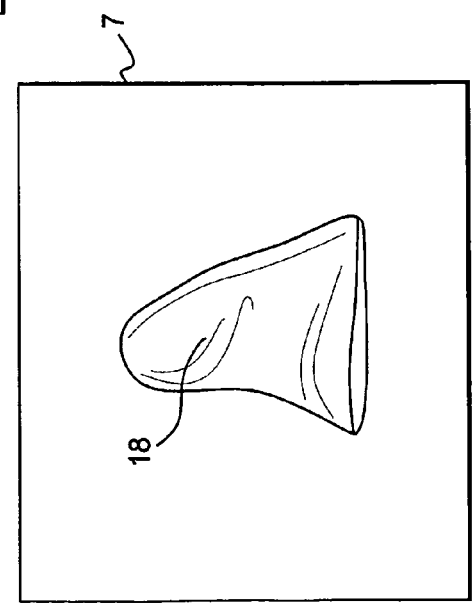

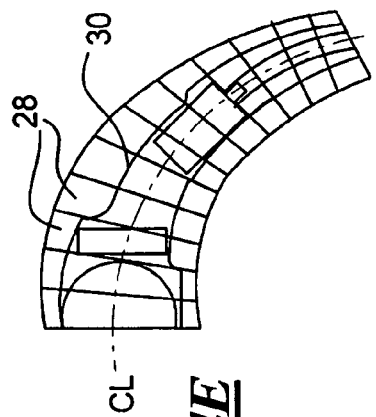
FIG. 4D
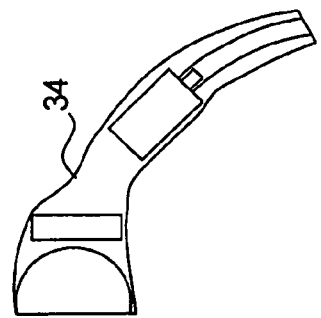
FIG. 4E
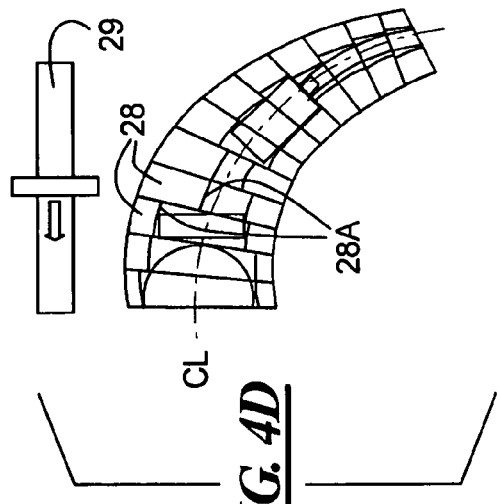
FIG. 5A
FIG. 5B
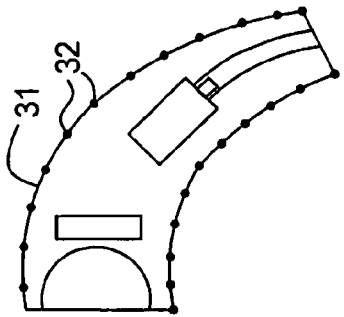
FIG. 5C
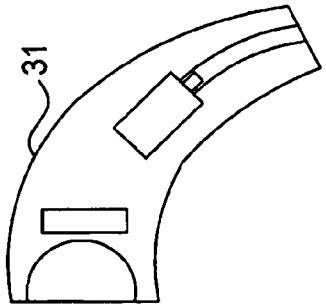
FIG. 5D

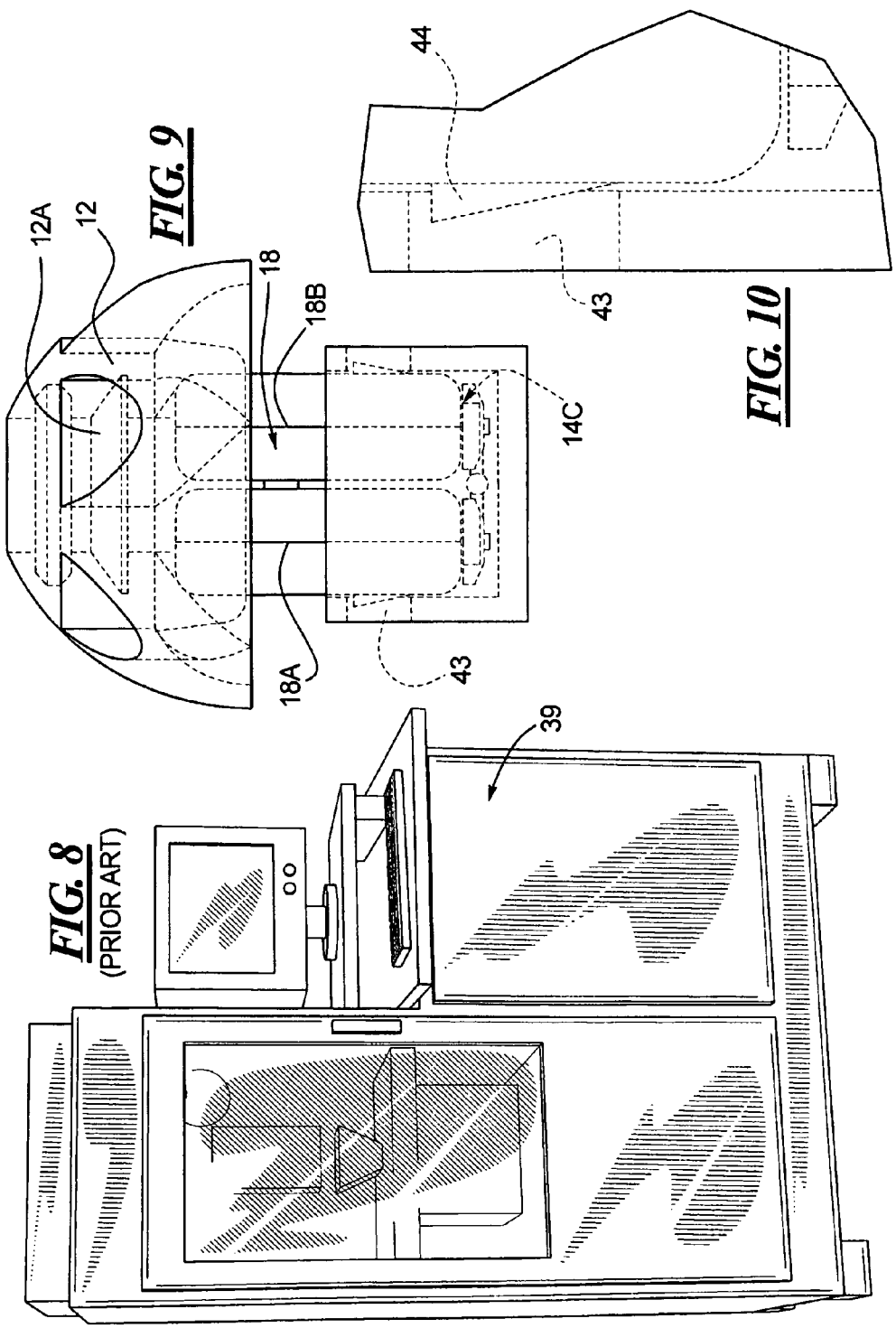

METHOD FOR ADAPTIVE CONSTRUCTION OF A SMALL CIC HEARING INSTRUMENT

CROSS-REFERENCE TO RELATED APPLICATION

This application claims the benefit of U.S. Provisional Application No. 61/041,336, filed Apr. 1, 2008, the disclosure of which is incorporated by reference herein in its entirety.

BACKGROUND

It is known to provide a completely-in-the-canal (CIC) hearing instrument (hearing aid) in which an outer housing known as a shell of the hearing aid, is formed in a shape corresponding to the ear canal. An outside surface of that shell is in contact with substantial portions of an inner surface of the ear canal. With such CIC hearing aids, because the hearing aid housing is substantially in contact with the ear canal, a vent cavity inside the shell is provided to allow air flow through the ear canal and thus permit pressure to be equalized between the outside and the inside of the ear drum. This vent cavity or channel also reduces occlusion effects and operation of the hearing aid. Occlusion effects are known in this industry as being a change in hearing acoustics which sounds like being in a tunnel.

SUMMARY

It is an object to decrease the size of the CIC hearing aid so that it is even smaller than the conventional CIC hearing aid.

A small hearing aid is provided which fits completely in an ear canal of a user wherein a shell as an outer housing of the hearing aid is shaped to closely surround components of the hearing aid to provide a gap between the hearing canal inner walls and the shell to allow flow of air when the hearing aid is mounted in the ear by a mounting element connected to the shell. The mounting element is provided with at least one aperture to allow the air flow. In a fabrication method, an image of the shell is shrunk to closely surround the hearing aid components while maintaining a shape of the ear canal to assure a custom fit.

BRIEF DESCRIPTION OF THE DRAWINGS

FIG. 1 is a side view of a CIC hearing instrument;

FIGS. 2A-2F illustrate method steps in the fabrication of the small CIC hearing aid with a semi-automated method;

FIGS. 4A-4E are illustrations of the first embodiment of the fully automated method for fabrication of the small CIC hearing aid;

FIGS. 5A-5D are cross-sectional views showing a user adding spline points on the hearing aid shell according to the second embodiment of the fully automated method;

FIG. 8 shows a prior art 3D stereolithography printer machine for fabricating the hearing instrument shell;

FIG. 9 is a side view of a mushroom cap mounting element, receiver, and receiver shell section having a latching mechanism for the small hearing aid; and FIG. 10 is a detail of the latching mechanism of FIG. 9 to latch the receiver shell section to one end of the receiver.

DESCRIPTION OF THE INVENTION

Figure 2D:
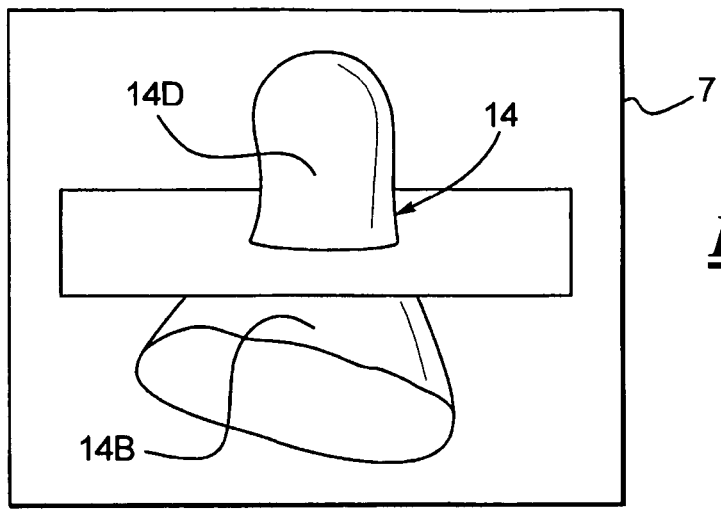

The invention allows fabrication of a CIC hearing instrument smaller than the prior art CIC hearing instrument. The CIC hearing instrument described here has a profile smaller than the ear canal, since the hearing instrument shell is modeled around the components of the hearing instrument such that the shell is "shrunk" to more closely approximate the size of the hearing instrument components, rather than being sized to the ear canal inner walls. A mushroom cap or dome is used to secure the small hearing instrument inside the ear canal. This mushroom cap has an periphery contacting inner side walls of the ear canal near the ear drum and air vent apertures are provided therein as described hereafter.

FIG. 1 illustrates a CIC hearing instrument 10 positioned in the ear canal 11 with the ear canal being shown in dashed lines. The mushroom cap or dome 12, functioning as a mounting element for the hearing instrument 10, is positioned near the ear drum 11A in the ear canal 11. This mounting element or dome 12 comprises a plurality of vent apertures 12A in a dome wall 12B, and a periphery or outer peripheral surface 12C that conforms to and engages the ear canal inner wall 11B. The vent apertures 12A permit airflow through the ear canal 11 to and from the ear drum 11A and through the dome 12 to ensure that pressure on the ear drum 11A is equalized and also to improve overall acoustical comfort of the hearing instrument 10. A gap or passage 13 between the inner wall 11B of the ear canal 11 and remaining portions of the small hearing instrument 10 enables air passing through the vent apertures 12A to freely pass through the gap 13 between sidewall 11B and the hearing instrument shell 14 extending from the dome 12.

The hearing instrument 10 has a shell 14 comprising a receiver shell section 14A having a receiver 18 (FIG. 9) connected to a short mounting section or mounting face 14D at one end facing the ear drum 11A that accepts the mushroom cap or dome 12 and a shell section 14B housing additional components. Also in FIG. 1, an optional curved shell section 14C not employed in FIGS. 2C-2F may be provided as a transition section. The end 14F of the shell section 14B facing the outer ear, i.e., the direction opposite from the ear drum 11A, contains the faceplate 60 and controls 62, as illustrated in FIG. 1. The gap or passage 13 runs continuously from the dome 12 to the faceplate 60 on the outer surface 14E of the shell 14. The gap or passage 13 is created by the difference between the peripheral dimension 70 of the shell 14 along the length 72 of the shell 14 and the inner dimensions of the ear canal 11. The size of the gap or passage 13 is determined by measuring the contours of the user's ear and then sizing the shell 14 accordingly, as explained below.

The fabrication of the small hearing aid will now be described with reference to FIGS. 2A-2F, 3, 4A-4E, 5A-5D, 6A-6D, 7, and 8. With the fabrication method, fixed geometries are used to shrink the outer shell to fit the internal components while maintaining a clearance between the shell and the ear canal to provide what is known as an open fit.

FIGS. 2A-2F are computer screens 7 showing computer-aided design (CIC) illustrations of successive steps of the design process. FIG. 2A shows a raw impression 8 of the patient's ear canal for the custom fit. This raw impression 8 is created by a technician first making an impression of a patient's ear canal with a two part silicon material placed in the patient's ear which hardens and is then removed. Impression 8 is then scanned with a scanner 9. Commercially available scanners may be used for this purpose such as the Minolta Sailor 3 Scanner with related software. The scanner 9 and related software outputs what is known as an STL file 9A based on a cloud of points (point cloud) at an outer periphery of the impression 8. An STL file is well known in this field and represents a 3D point cloud image. The STL file raw impression image is illustrated at 17 on the computer screen illustration of FIG. 2A.

FIGS. 2A-2F represent a semi-automated method of fabrication.

Creating the raw impression and scanning the raw impression to create an STL file is known prior art.

Thereafter as shown in FIG. 2B, using the raw impression image 17 in FIG. 2A, an operator manually extracts a portion of the raw impression image to create a detail image 18 of the raw impression image 17. This detail image is similar to that employed in the construction of a prior art CIC hearing aid shell. In FIG. 2B, the modeling and detailing of the raw impression image can be performed by commercially available software known in the prior art such as the 3SHAPE modeling software.

In FIG. 2C, the receiver shell section 14A along with the short mounting shell section 14D and expanded shell section 14B form the hearing aid shell 14. Here, the operator manually shrinks the shell 14 down and around the hearing aid components comprising the receiver and the other hearing aid components like a "shrink fit".

In FIG. 2D the shell 14 which has been preshrunk in FIG. 2C is now cut to provide a gap in which the receiver shell section 14A is to be placed between the expanded section 14B and short mounting shell section 14D which receives the mushroom cap 12.

Figure 2E:
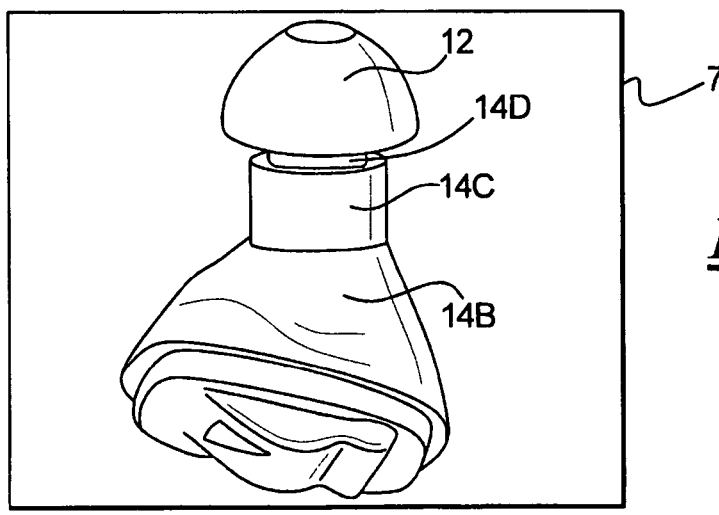

In FIG. 2E, the receiver section 14C is merged to one end of the expanded section 14B and also receives the short mounting section 14D at the other end.

Figure 2F:
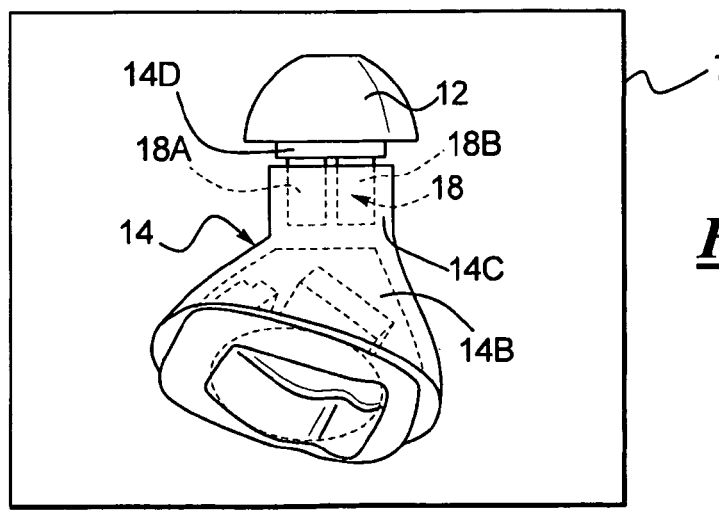

In FIG. 2F, the finished product is provided showing the mushroom cap 12 on the short mounting section 14D, the receiver 18 comprising receiver modules 18A, 18B received in the receiver shell section 14C, and the expanded shell section 14B resulting in the finished product (shell 14 connected to mushroom mounting element or cap 12).

As an alternative to the semiautomatic mode involving manual manipulation by an operator, a fully automated method which automatically shrinks the outer shell 14 to the components by using fixed geometries is provided. As in the case of the semi-automatic method, with the automatic method a clearance is provided between the shell (hearing aid outer housing) and the ear canal that provides the open fit previously described.

Figure 3:
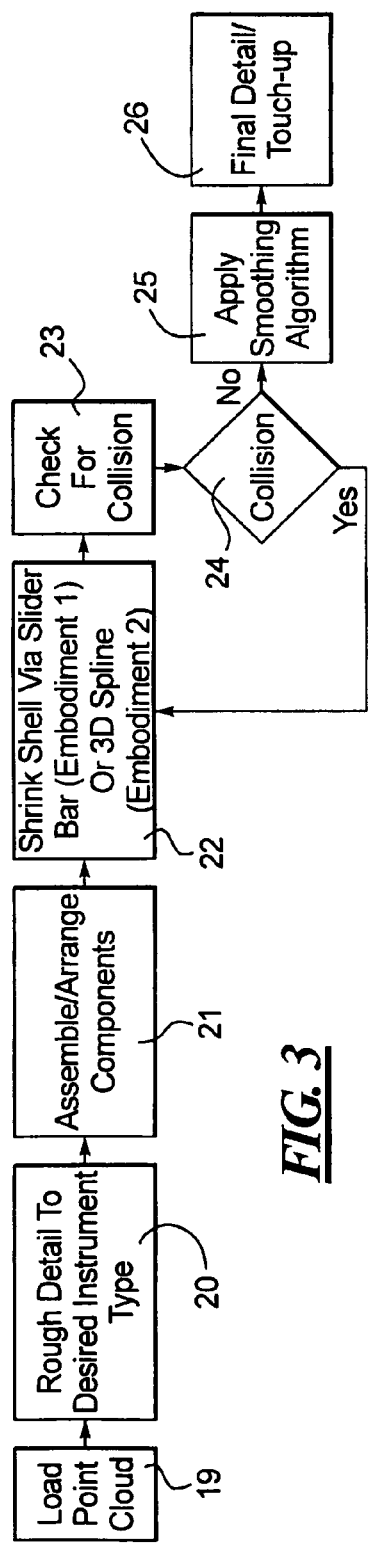
FIG. 3 is a flow chart for both first and second embodiments of a substantially fully automated method of fabrication of the small CIC hearing aid.

Three alternative embodiments are provided for the fully automated method. A flowchart of the first and second embodiments is shown in FIG. 3. As illustrated there, at step 19 the point cloud is loaded. At step 20, the rough detail to the desired instrument type is provided. At step 21 components are assembled/arranged. At step 22 the shell is shrunk via the slider bar (embodiment 1) or via 3D spline (embodiment 2).

At step 23 a check is made for collision between the components and the shell. At decision block 24, if there is a collision, then the shell is again shrunk. If there is no collision, as shown at step 25 a smoothing algorithm is applied. Finally, at step 26, the final detail/touch-up occurs.

Figure 4C:
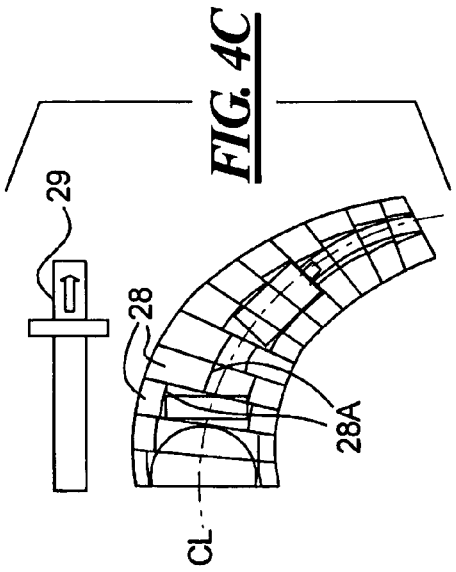
Figure 4B:
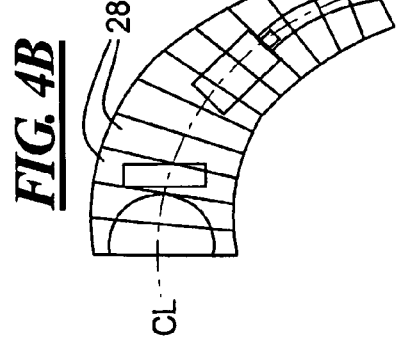
Figure 4A:
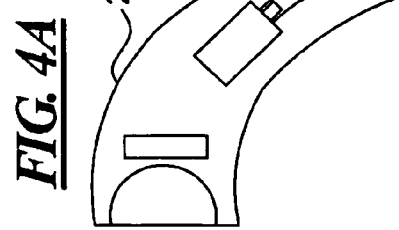

FIGS. 4A-4E show how the shell is shrunk to fit the components and thus provide a gap between the shell 14 and the ear canal sidewall 11B (see also FIG. 1). FIG. 4A illustrates the starting shell 27 which is about the size of the ear canal. In FIG. 4B, the center line is computed, and the shell is sectioned into sectors 28 perpendicular to the center line CL. In FIG. 4C, the slider bar 29 is moved and each sector 28 will shrink as shown at 28A until collision of that portion of the shell with the component is detected. In FIG. 4D, the operator will exercise caution to ensure embedded components can be assembled. In FIG. 4E, a smoothing algorithm is applied with a cleanup using existing tools where necessary. The completed cleaned up shrunken shell is shown at 30.

With embodiment 1 of the fully automated method, the following occurs:

1. The software takes as an input an STL file that represents the receiver shell section around the receiver.

2. The software positions the receiver shell section as deep as possible inside a virtual cast representing the inside of the ear canal.

3. The software allows the user to position the other hearing aid components inside the virtual cast (ear canal), and shows a clearance equal to the shell thickness value between the other components and the virtual cast (ear canal).

4. The software grows the STL shell section towards the other components in such a way that the expanded shell section touches the virtual cast (ear canal) along the longest axis of the canal and has some free space between the expanded shell section and the virtual cast (ear canal) along the short axis of the canal.

5. The shrink wraparound the receiver and other components generated as a result of this operation shall have a minimum space required to cover the hearing aid receiver and other components.

6. The software ensures that on the face plane the shrink wrapped shell shall touch the virtual cast (ear canal) along the long axis of the canal.

7. The software ensures that the shrink wrap shall not collide with the virtual cast (ear canal). This ensures that the shell does not flop in the ear.

A second embodiment for the fully automated method is shown in FIGS. 5A-5D. FIG. 5A shows the starting shell 31. In FIG. 5B, spline points at 32 are added.

In FIG. 5C spline points allow the user to grab these spline points and adjust the shape of the shell as shown at 33.

In FIG. 5D the shrunken shell 34 results.

In the second embodiment for the fully automated method, the following steps occur:

1. The software takes as an input an STL file format that represents the receiver shell section and an STL file that represents the expanded shell section around the other components.

2. The software positions the STL file that represents the receiver shell section around the receiver as deep as possible inside the virtual cast (ear canal) without collisions with the virtual cast (ear canal).

3. The software positions the STL file that represents the expanded shell section around the other components as deep as possible inside the virtual cast without collisions with the virtual cast (ear canal) and an STL file that represents the receiver shell section around the receiver.

4. The software grows an STL file that represents the expanded shell section around other components in the direction of an STL file that represents the receiver shell section around the receiver in such way that no collision with the virtual cast (ear canal) occur.

5. The software grows an STL file that represents the receiver shell section around the receiver in the direction of an STL file that represents the expanded shell section around the other components in such a way that no collision with the virtual cast (ear canal) will occur.

6. The software ensures that the growing surfaces of an STL file that represents the expanded shell section around the other components and an STL file that represents the receiver shell section around the receiver will meet in-between two STL files and allow the seamless merge of two STL files to form a single shell.

7. The software merges the grown surfaces of an STL file that represents the receiver shell section around the receiver with the grown surface of an STL file that represents the expanded shell section around the other components to form a single hearing aid shell.

A third embodiment for the fully automated method will now be described with reference to FIGS. 6A-6D.

Figure 6A:
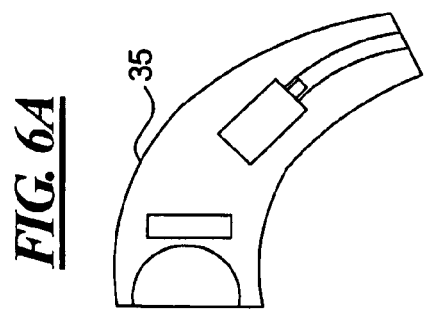
FIGS. 6A-6D illustrate how a user is able to use a detailing tool where the hearing aid shell needs to be modified.

In FIG. 6A, the shell 35 of the hearing aid with components therein is illustrated.

Figure 6B:
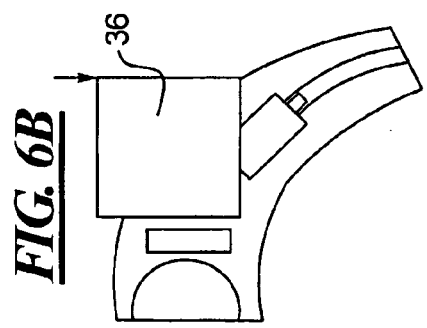

In FIG. 6B, the user is able to use the detailing tool where the user selects a section 36 of the shell that needs to be modified.

Figure 6C:
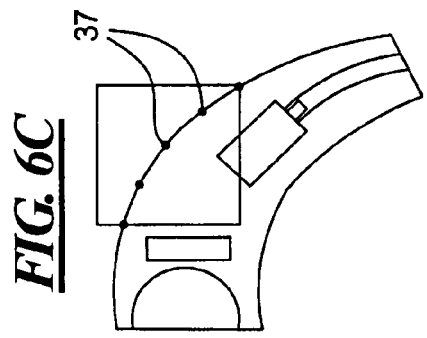

In FIG. 6C, adjustment points 37 are added to the shell in the section 36 to be modified which allows the user to adjust the shell using these points 37. There is no creating of splines.

Figure 6D:
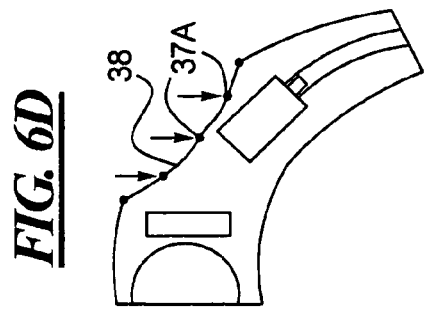

In FIG. 6D, the shell has been adjusted as shown at 38 by moving the points 37 downwardly to 37A, for example to modify the shell.

With the third embodiment for the fully automated method illustrated in FIGS. 6A-6D, the following steps occur:

1. The software takes as an input for this approach an STL file that represents the generic small hearing aid shell.

2. The software positions the generic small hearing aid shell in the virtual cast (ear canal) in such a way that no collisions occur before an area where bending of the shell is to occur.

3. Software bends the hearing aid shell in such a way that the bent hearing aid shell fits in a virtual cast (ear canal) without collisions.

For either the semi-automated or fully automated method, the final result is an STL file which is now sent to rapid prototype equipment such as SLA Viper or other 3D printers (also known as SLA stereolithography printers). Such printers are well known in the art and accept STL files to create three dimensional final objects, in this case a fabricated shell.

Figure 7A:
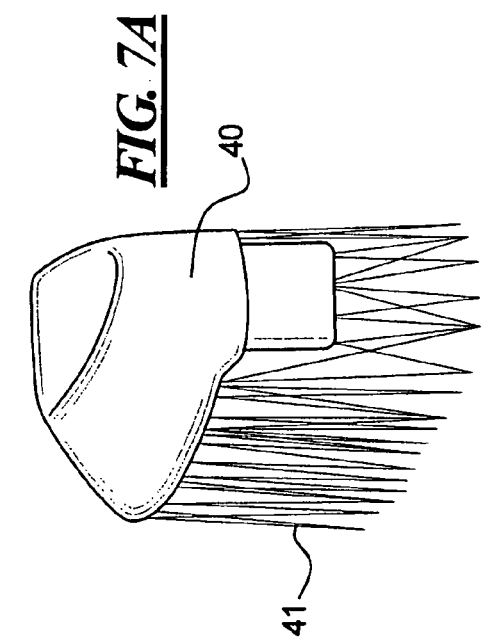
FIG. 7 illustrates in a side view a building of the hearing aid shell using a 3D printer in a stereolithography process.
Figure 7B:
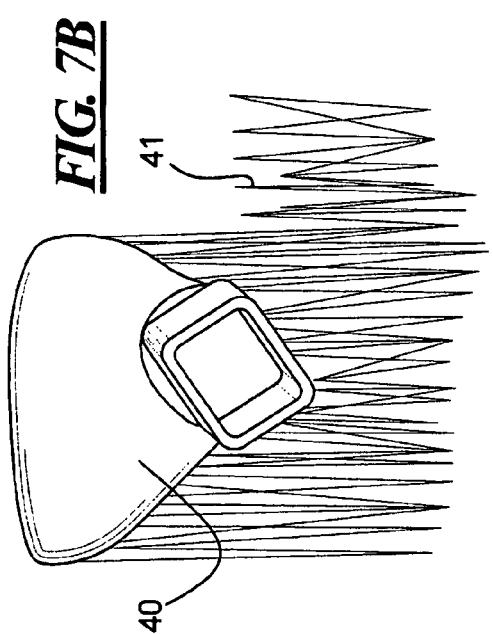

As shown in the two view of FIGS. 7A and 7B, the commercially available 3D printer shown in FIG. 8 builds the shell 40 on top of a support material 41. The building of the shell and the use of support material with the known prior art 3D printer such as 39 (the known SLA Viper, for example) is known in the art.

FIG. 9 shows the mushroom cap or dome (mounting element) 12, the vent apertures 12a, the receiver 18 formed of modules 18A and 18B and the receiver shell section 14C of shell 14 (forming a pocket) in a side view. The receiver 18 is installed into the receiver shell section 14A. In order to ensure that the receiver 18 is secured in the pocket-like receiver shell section 14A, RTV is used and also a mechanical latch system is provided to assure reliability and serviceability. This mechanical latch system is shown as a female latch element 43 and a male latch element 44 in detail in FIG. 10. A male latch element is provided on each receiver module 18A, 18B and a respective female latch element 43 is provided at opposite sides of the receiver shell section 14C. As an alternative to male and female latch elements tongue and groove elements may be employed.

We claim as our invention:

1. A method for fabricating a completely-in-the-canal hearing instrument for insertion into an ear canal of an ear comprising an outer ear and an ear drum, the ear canal comprising an ear canal wall, where the hearing instrument resides completely in the ear canal, comprising:
   determining the dimensions of the ear canal;
   fabricating a completely-in-the-canal hearing instrument shell, the shell comprising
      an end facing the outer ear and an end facing the ear drum;
      a length;
      an outer surface comprising a peripheral dimension along the length of the shell, where the peripheral dimension is less than the dimensions of the ear canal along the length of the shell;
      a faceplate on the end of the shell facing the outer ear;
      a mounting face on the end of the shell facing the ear drum; and
   affixing a dome to the mounting face of the shell, the dome comprising
      a dome wall;
      an outer peripheral surface conforming to and engaging the walls of the ear canal; and
      at least one vent in the dome wall; and
   creating a passage comprising a gap between the ear canal wall and the outer surface of the shell, the passage extending continuously along the length of the shell from the vent in the dome to the faceplate.

2. A method as forth in claim 1, where the step of creating the passage comprises reducing the shell peripheral dimension along the length of the shell.

3. A completely-in-the-canal hearing instrument for insertion into an ear canal of an ear comprising an outer ear and an ear drum, the ear canal comprising an ear canal wall, where the hearing instrument resides completely in the ear canal, comprising:
   a completely-in-the-canal hearing instrument shell, the shell comprising
      an end facing the outer ear and an end facing the ear drum;
      a length;
      an outer surface comprising a peripheral dimension along the length of the shell, where the peripheral dimension is less than the dimensions of the ear canal along the length of the shell;
      a faceplate on the end of the shell facing the outer ear;
      a mounting face on the end of the shell facing the ear drum; and
   a dome affixed to the mounting face of the shell, the dome comprising
      a dome wall;
      an outer peripheral surface conforming to and engaging the walls of the ear canal; and
      at least one vent in the dome wall; and
   a passage comprising a gap between the ear canal wall and the outer surface of the shell, extending continuously along the length of the shell from the vent in the dome to the faceplate.

4. A hearing instrument as forth in claim 3, where the shell peripheral dimension is reduced along the length of the shell.

* * * * *